(12) United States Patent
Buesgen et al.

(10) Patent No.: US 7,418,305 B2
(45) Date of Patent: Aug. 26, 2008

(54) METHOD OF GENERATING A COMPONENT OF A COMPONENT-BASED AUTOMATION SYSTEM

(75) Inventors: Ralph Buesgen, Duluth, GA (US); Edwin Anthony Prince, Suwanee, GA (US); Chellury R. Sastry, South Brunswick, NJ (US); Peng Zhao, Bethlehem, PA (US); Georg Biehler, Nürnberg (DE); Richard Miceli, Hoffman Estates, IL (US)

(73) Assignee: Siemens Corporate Research, Inc., Princeton, NJ (US)

( * ) Notice: Subject to any disclaimer, the term of this patent is extended or adjusted under 35 U.S.C. 154(b) by 378 days.

(21) Appl. No.: 11/253,278

(22) Filed: Oct. 18, 2005

(65) Prior Publication Data

US 2006/0190112 A1   Aug. 24, 2006

Related U.S. Application Data

(60) Provisional application No. 60/651,538, filed on Feb. 9, 2005.

(51) Int. Cl.
*G06F 17/50* (2006.01)
*G06F 19/00* (2006.01)
*G06G 7/48* (2006.01)

(52) U.S. Cl. .................. 700/95; 716/1; 703/6; 700/121
(58) Field of Classification Search .................. 716/1; 703/6; 700/95–97, 121; 718/100
See application file for complete search history.

(56) References Cited

U.S. PATENT DOCUMENTS

| 2004/0098706 | A1 | 5/2004 | Khan et al. |
| 2006/0133412 | A1* | 6/2006 | Callaghan .................. 370/465 |
| 2007/0225954 | A1* | 9/2007 | Kodosky et al. .............. 703/2 |

* cited by examiner

*Primary Examiner*—Stacy A Whitmore
(74) *Attorney, Agent, or Firm*—Donald B. Paschburg; F. Chau & Associates, LLC (57) ABSTRACT

A computer-implemented method for generating a description of a component of an automation system comprises describing the component as a plurality of inputs and outputs, generating a vendor-independent component description file based on a description of the component as the plurality of inputs and outputs, updating the vendor-independent component description file to include vendor-specific hardware information and hardware control logic, and creating the component based on an updated vendor-specific component description.

14 Claims, 8 Drawing Sheets

METHOD OF GENERATING A COMPONENT OF A COMPONENT-BASED AUTOMATION SYSTEM

This application claims priority to U.S. Provisional Application Ser. No. 60/651,538, filed on Feb. 9, 2005, which is herein incorporated by reference in its entirety.

BACKGROUND OF THE INVENTION

1. Technical Field

The present invention relates to component-based automation systems, and more particularly to a system and method for generating and implementing descriptions of components.

2. Discussion of Related Art

A trend in the automation industry has been to move away from central control architectures and towards distributed local units. End users of automation systems, system integrators, and original equipment manufactures (OEMs) are looking at ways and means to utilize the benefits of decentralized control and distributed automation in manufacturing processes.

Benefits for distributed automation include: immediate local processing of time sensitive signals and data leading to more efficient plant operation; improved design flexibility through the use of plug-and-play automation software and the utilization of different devices and different field bus technologies from different vendors; improved reuse of knowledge through the utilization of fully trusted stand-alone automation solutions in different plant configurations for different automation tasks; improved ability to handle changes to device configurations; and vertical integration of plant automation systems with the enterprise information technology (IT) infrastructure, etc.

Figure 1:
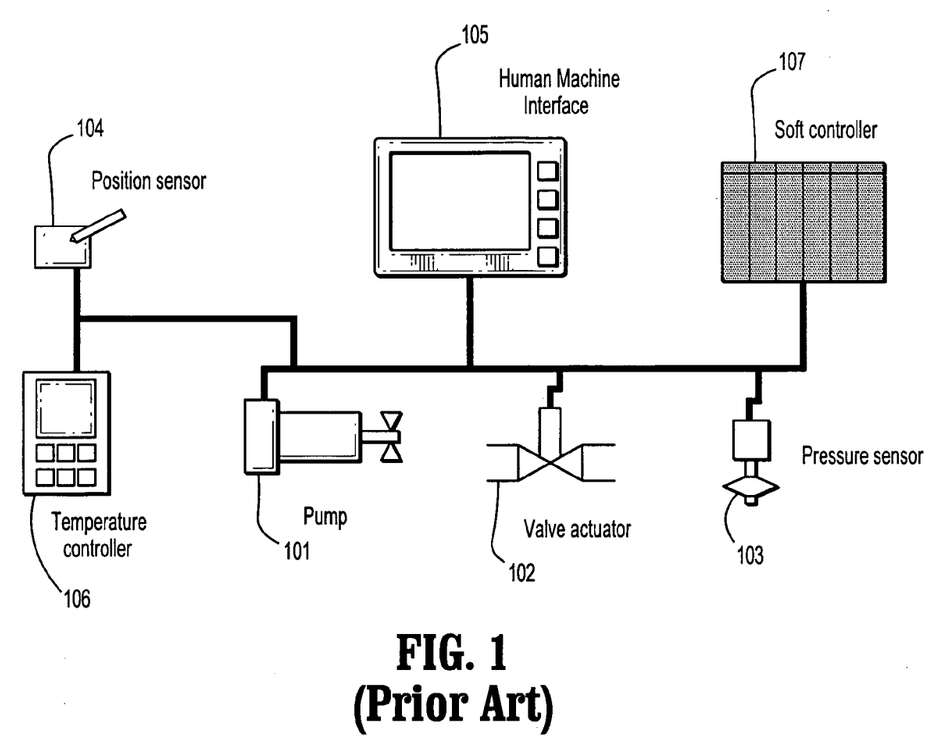
FIG. 1 is a diagram of a distributed control system.

An example of a distributed control system is shown in FIG. 1. The distributed parts of the control system include smart devices, such as pumps 101, valves 102, and sensors 103-104 that have built-in control functionality that can be linked by software to other peripherals, such as a human/machine interface (HMI) panel 105, temperature controllers 106, and soft-controllers 107 to enable control system functionality. For example, a pressure sensor 104 can be coupled by software to a valve actuator 102 and to the HMI panel 105 to display bar graph. A slider on the HMI panel 105 can be coupled via software to the set point of a PID (Proportional, Integral, Derivative) controller controlling the speed of a pump 101.

To facilitate decentralized control and distributed automation, the individual distributed field devices and applications need to communicate seamlessly irrespective of the manufacturers of the devices and systems, and irrespective of the field-bus technology that particular devices are designed for.

Therefore, a need exists for a system and method for generating and implementing descriptions of components in a component-independent automation system.

SUMMARY OF THE INVENTION

According to an embodiment of the present disclosure a computer-implemented method for generating a description of a component of an automation system comprises describing the component as a plurality of inputs and outputs, generating a vendor-independent component description file based on a description of the component as the plurality of inputs and outputs, updating the vendor-independent component description file to include vendor-specific hardware information and hardware control logic, and creating the component based on an updated vendor-specific component description.

The method further comprises coupling the component to a network of components. The method comprises providing a network proxy for the component wherein the component uses a communications standard different than the network of components.

Generating the vendor-independent component description file comprises generating a human-readable file corresponding the vendor-independent component description file.

Generating the vendor-independent component description file comprises generating a programmable logic control program for controlling the component via the inputs and outputs.

Updating the vendor-independent component description file comprises updating the programmable logic control program to include vendor-specific control logic for controlling the component via the inputs and outputs.

The description of the component as the plurality of inputs and outputs may consist of a header, a vendor-independent device specification, network-related information and an input and output interface description.

According to an embodiment of the present disclosure, a program storage device is provided readable by machine, tangibly embodying a program of instructions executable by the machine to perform method steps for generating a description of a component of an automation system. The method includes describing the component as a plurality of inputs and outputs, generating a vendor-independent component description file based on a description of the component as the plurality of inputs and outputs, updating the vendor-independent component description file to include vendor-specific hardware information and hardware control logic, and creating the component based on an updated vendor-specific component description.

According to an embodiment of the present disclosure, a method for generating a description of a component of an automation system comprises describing the component as a plurality of inputs and outputs to the automation system, generating a vendor-independent component description file based on a description of the component as the plurality of inputs and outputs, and selecting hardware for creating the component according to the description of the component as the plurality of inputs and outputs. The method includes updating the vendor-independent component description file to include vendor-specific hardware information and hardware control logic corresponding to the hardware for creating the component, and creating the component using the hardware based on an updated vendor-specific component description.

The method includes coupling the component directly to the automation system wherein the component supports a communication standard of a network of the automation system.

The method includes coupling the component to the automation system via a proxy, wherein the component does not support a communication standard of a network of the automation system.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a vendor-independent component description is generated. The component description is realized as a component implemented in a system and/or method that performs decentralized control and distributed automation of components for component-based automation (CBA). A component is an encapsulated, reusable software module representing an intelligent field device or application. The components conform to a standard for the application of function blocks in distributed industrial/process measurement and control systems, for example, a standard such as IEC (International Electrotechnical Commission) 61499. The function blocks in an interconnected-system are individual Distributed Component Object Model (DCOM) objects representing each automation component.

Figure 2:
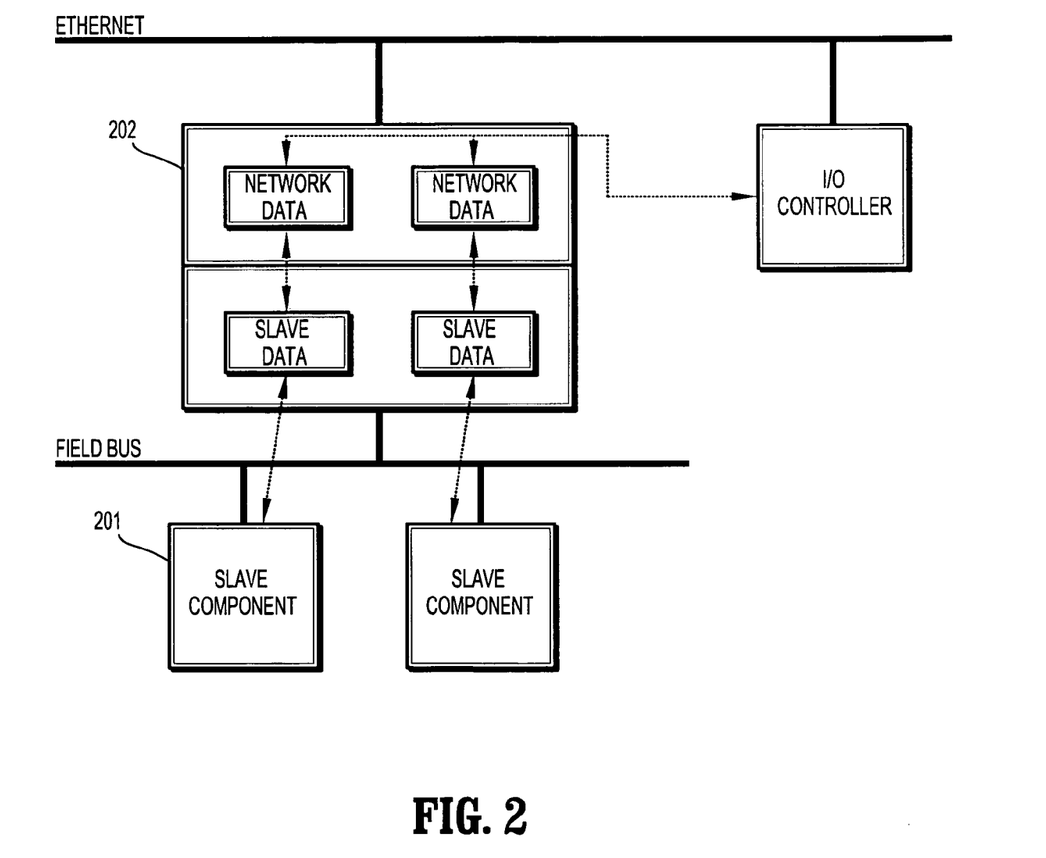
FIG. 2 is a diagram of a system architecture according to an embodiment of the present disclosure.

Referring to FIG. 2, an example of a component based automation system includes a network and a field bus. A component 201 is connected to the network via a proxy 202. Device information for a field bus slave component 201 may be added to couple a component to a proxy 202 (which links the software controllers to the components). The proxy 202 represents slaves 201 on a field bus, for example, PROFIBUS, for communication on a network, e.g., Ethernet.

In exemplary embodiments provided herein "end user" refers to engineer(s)/operator(s) of a plant production line interact with automation components ('machines') from an I/O standpoint and not the internal hardware details. The term "OEM" (original equipment manufacture) denotes the engineer(s), scientist(s), or technician(s) who receives machine description and plant configuration information from the end user(s), and is responsible for coming up with the needed hardware specifications to implement the machine functionality. The term "vendor" refers to a person or organization that is responsible for manufacturing hardware (like programmable logic controls (PLCs)) and associated engineering software.

According to an embodiment of the present disclosure, a graphical component editor (e.g., see FIG. 3A) enables end users and system integrators to design and view different machines and components through respective input/output representations. These components are stand-alone automation modules. The editor generates simple vendor-independent component description (PCD) files, which can be imported into an engineering software packet, such as SIMATIC iMap®, wherein a plant configuration in an architecture can be understood before a commissioning phase. Furthermore, end users and system integrators can use the editor to input their own device information (for example, in a system implementing PROFIBUS, using a PROFINET component editor modified in accordance with an embodiment of the present disclosure, the given information is vendor independent; it describes a slave device with specific modules chosen in a vendor independent fashion), and generate enriched PCD files, which OEMs can utilize as specifications to realize hardware needed to generate the machine or component and associated programs. The graphical editor enables end users and system integrators to modify existing PCD files. Both simple and enriched PCD are vendor independent.

While examples of components and networks herein as described in terms of PROFINET, other Industrial Ethernet standards for automation, e.g., Modbus® TCP or Ethernet/IP, may be implemented in conjunction with embodiments described herein.

To configure and design plants at the machine or component level, engineering software packages such as SIMATIC® STEP 7 are not needed. Furthermore, an engineering software packet, e.g., SIMATIC iMap®, used to configure a plant as a set of interconnected components, does not need vendor specific information. The simple PCD files contain vendor independent information. The simple PCD file includes header information, a vendor-independent device specification, network-related information and an I/O interface description. The vendor-independent device specification may be input by a user or automatically generated. The network-related information may include, for example, an IP address of a component. The I/O information description is defined by the end user.

Device information may be added by end users or system integrators. A resulting enriched PCD file includes the information of the simple PCD file and further includes vendor-independent device specific or field bus slave information.

Figure 3A:
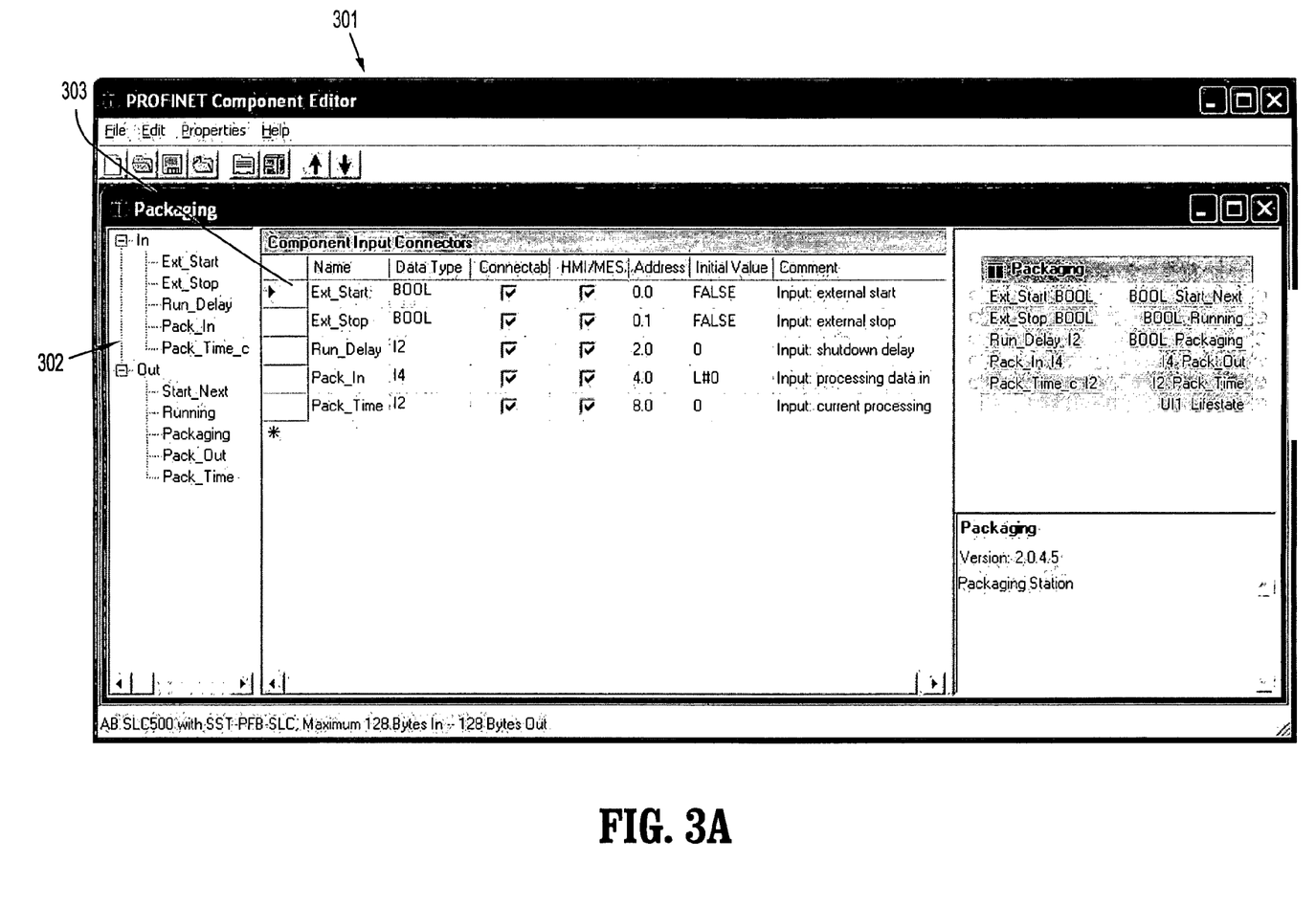
FIG. 3A is an illustration of an editor according to an embodiment of the present disclosure.
Figure 3B:
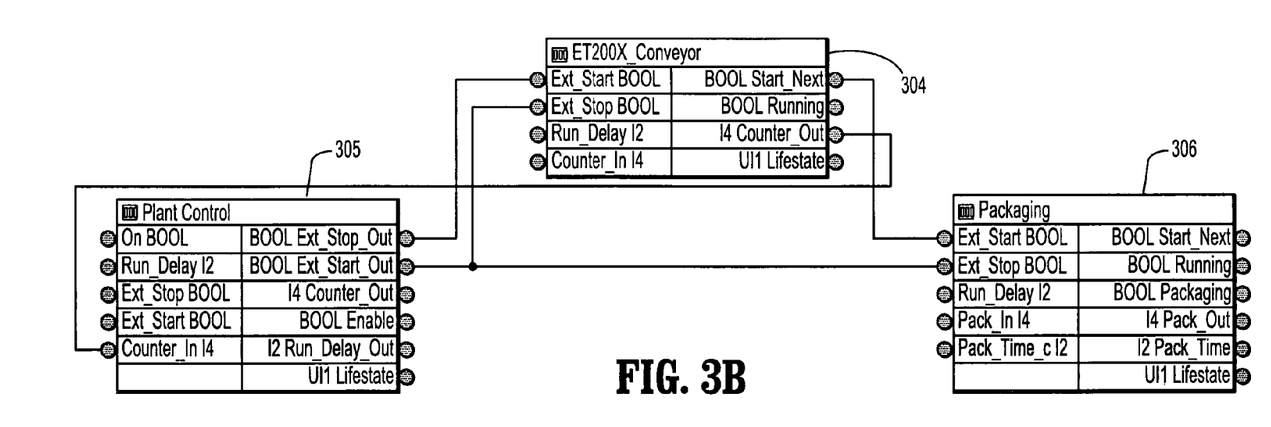
FIG. 3B is an illustration of a system diagram at in I/O level according to an embodiment of the present disclosure.

An example of a graphical editor is shown in FIG. 3A. As shown in FIG. 3A, end users can utilize the graphical editor 301 to define a machine or component based on I/Os 302. FIG. 3B illustrates a plurality of components described as a collection of I/Os. Details about how such a machine is to be implemented are not needed. The graphical editor includes facilities, e.g., check boxes, text-boxes, etc., for describing the I/Os. For example, an input Ext-Start 303 is named, and a data-type is defined, in this example, as a BOOL or Boolean value. Further, check boxes are provided for different features, for example, for indicating that a human-machine-interface (HMI) is to be provided within a manufacturing execution system (MES) framework. An address and initial value can also be provided in the example. The I/O description of the machine or component is formatted as an XML file referred to as PROFINET Component Description (PCD) file. The initial PCD file is a simple PCD file. Also generated is a human readable description of the component, referred to as a comma separated value (CSV) file. An AWL file (PLC program file) is generated that comprises source code and can be utilized by OEMs using PLCs to generate data blocks.

After the I/O is specified, and end user may select the File->Save As menu option to generate simple PCD files. A simple PCD file for the ET200X_Conveyer component may be written as:

```xml
- <pnc:Connector Name="Ext_Start" Directions="In">
    <pnc:TType>{00000000-0000-0000-0000-000000000000}
    </pnc:TType>
    <pnc:LangText Value="Input:external start" TextId="101"
    xml:lang="en"/>
    <pnc:BOOL/>
  </pnc:Connector>
- <pnc:Connector Name="Ext-Stop" Directions="In">
    <pnc:TType>{00000000-0000-0000-0000-000000000000}
    </pnc:TType>
    <pnc:LangText Value="Input:external stop" TextId="102"
    xml:lang="en"/>
    <pnc:BOOL/>
  </pnc:Connector>
- <pnc:Connector Name="Run_Delay" Directions="In">
    <pnc:TType>{00000000-0000-0000-0000-000000000000}
    </pnc:TType>
    <pnc:LangText Value="Input:shutdown delay" TextId="103"
    xml:lang="en"/>
    <pnc:I2/>
  </pnc:Connector>
- <pnc:Connector Name="Pack_In" Directions="In">
    <pnc:TType>{00000000-0000-0000-0000-000000000000}
    </pnc:TType>
    <pnc:LangText Value="Input:processing data in" TextId="104"
    xml:lang="en"/>
    <pnc:I4/>
  </pnc:Connector>
- <pnc:Connector Name="Pack_Time_c" Directions="In">
    <pnc:TType>{00000000-0000-0000-0000-000000000000}
    </pnc:TType>
    <pnc:LangText Value="Input:current processing time" TextId="105"
    xml:lang="en"/>
    <pnc:I2/>
  </pnc:Connector>
- <pnc:Connector Name="Start_Next" Directions="Out">
    <pnc:TType>{00000000-0000-0000-0000-000000000000}
    </pnc:TType>
    <pnc:LangText Value="Output:start next conveyor(if photo eye 3 is
    triggered)" TextId="106" xml:lang="en"/>
    <pnc:BOOL/>
  </pnc:Connector>
- <pnc:Connector Name="Running" Directions="Out">
    <pnc:TType>{00000000-0000-0000-0000-000000000000}
    </pnc:TType>
    <pnc:LangText Value="Output:status info (if conveyor is running)"
    TextId="107" xml:lang="en"/>
    <pnc:BOOL/>
  </pnc:Connector>
```

Note that in FIG. 3B, three components, ET200X_Conveyer 304, Plant Control 305, and Packaging 306 are loaded into the SIMATIC iMap software and interconnected (logical view). The simple PCD file descriptions are enough for this purpose. The end user has a visual image of how the plant looks like once the three components are interconnected (see FIG. 3B).

Figure 4:
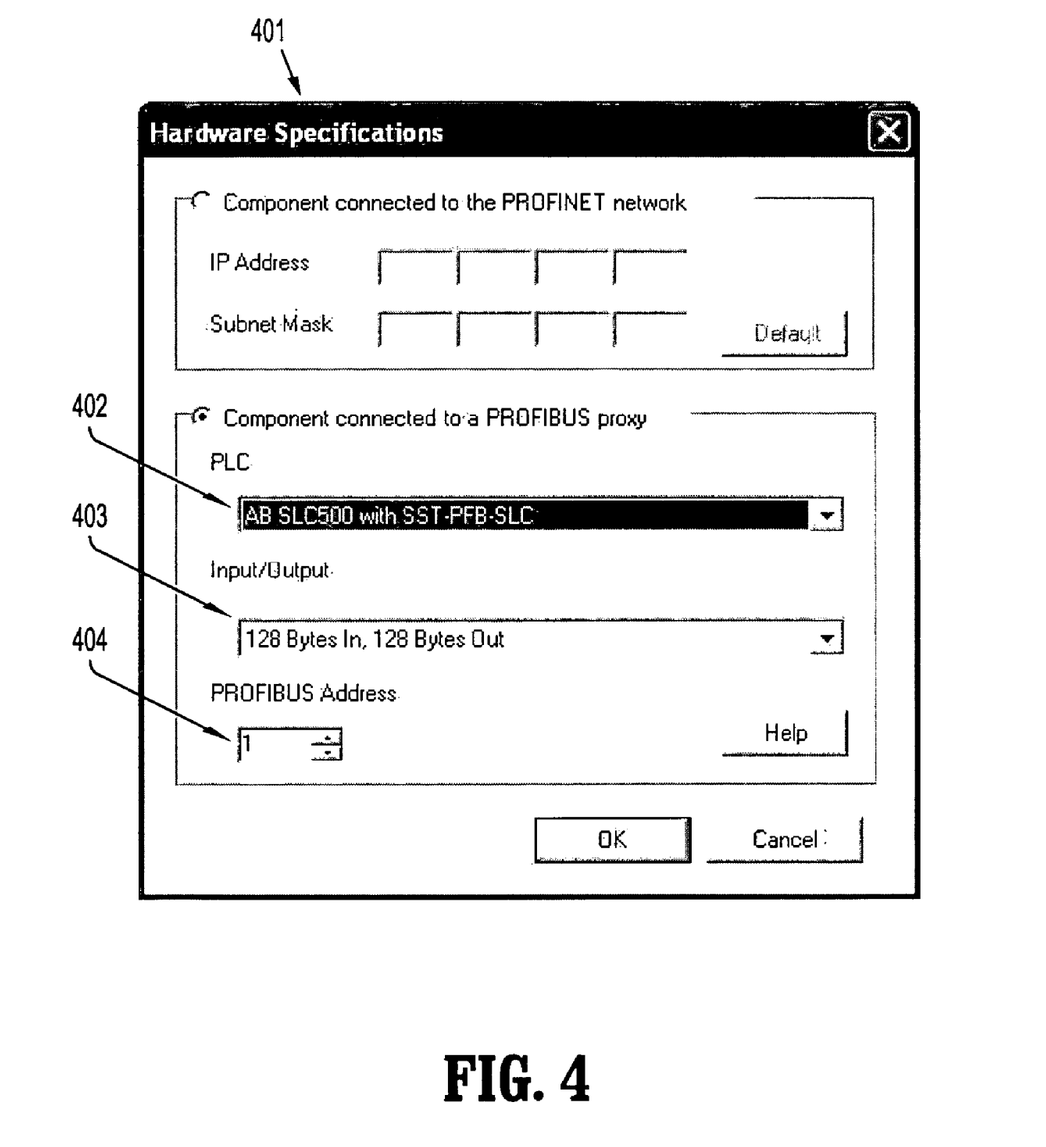
FIG. 4 is an illustration of an editor according to an embodiment of the present disclosure.

The end user specifies the I/Os and the resulting simple PCD file and CSV file can be delivered to an OEM or machine builder. The OEM or machine builder utilizes a graphical interface component 401, shown in FIG. 4, to specify which vendor-specific hardware (Siemens PLC devices, Omron PLC devices, etc.) will be utilized in the realization of the machine or component. The graphical interface 401 includes facilities for specifying PLC components, e.g., 402, I/O specifications 403 and an address 404, among other things. Through the specification of hardware parameters, e.g., I/O specifications, etc., the OEM or machine builder enriches the simple PCD file to include vendor-specific information, and an enriched PCD file is generated. An example of an enriched PCD file for the ET200X_Conveyer component may be written as:

```xml
- <pnc:Connector Name="Ext_Start" Directions="In">
    <pnc:TType>{00000000-0000-0000-0000-000000000000}
    </pnc:TType>
    <pnc:LangText Value="Input:external start" TextId="101"
    xml:lang="en"/>
    -<pnc:VendorData>
      <sie:S7Param Value="25 100 0 0 -1 4 0 0 1 -1"/>
    </pnc:VendorData>
    <pnc:BOOL/>
  </pnc:Connector>
- <pnc:Connector Name="Ext-Stop" Directions="In">
    <pnc:TType>{00000000-0000-0000-0000-000000000000}
    </pnc:TType>
    <pnc:LangText Value="Input:external stop" TextId="102"
    xml:lang="en"/>
    -<pnc:VendorData>
      <sie:S7Param Value="25 100 0 1 -1 4 0 1 1 -1"/>
    </pnc:VendorData>
    <pnc:BOOL/>
  </pnc:Connector>
- <pnc:Connector Name="Run_Delay" Directions="In">
    <pnc:TType>{00000000-0000-0000-0000-000000000000}
    </pnc:TType>
    <pnc:LangText Value="Input:shutdown delay" TextId="103"
    xml:lang="en"/>
    -<pnc:VendorData>
      <sie:S7Param Value="25 100 2 0 -1 4 2 0 5 -1"/>
    </pnc:VendorData>
    <pnc:I2/>
  </pnc:Connector>
- <pnc:Connector Name="Pack_In" Directions="In">
    <pnc:TType>{00000000-0000-0000-0000-000000000000}
    </pnc:TType>
    <pnc:LangText Value="Input:processing data in" TextId="104"
    xml:lang="en"/>
    -<pnc:VendorData>
      <sie:S7Param Value="25 100 4 0 -1 4 4 0 7 -1"/>
    </pnc:VendorData>
    <pnc:I4/>
  </pnc:Connector>
- <pnc:Connector Name="Pack_Time_c" Directions="In">
    <pnc:TType>{00000000-0000-0000-0000-000000000000}
    </pnc:TType>
    <pnc:LangText Value="Input:current processing time" TextId="105"
    xml:lang="en"/>
    -<pnc:VendorData>
      <sie:S7Param Value="25 100 8 0 -1 4 8 0 5 -1"/>
    </pnc:VendorData>
    <pnc:I2/>
  </pnc:Connector>
```

The OEM enters hardware information using an editor (for example, see FIG. 3A), and updates the simple PCD file (e.g., File->Save menu option), such that the simple PCD file is enriched and enclosed is an enriched PCD file.

Figure 3C:
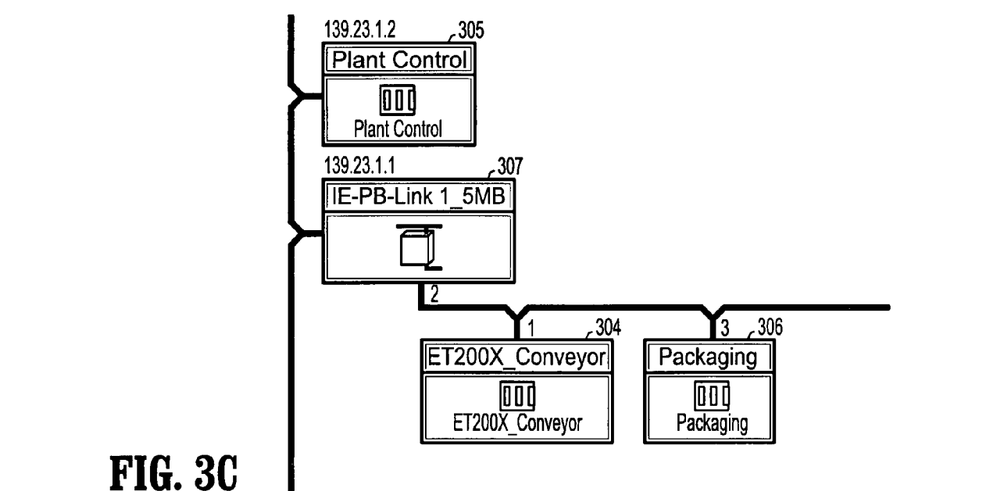
FIG. 3C is an illustration of the system of FIG. 3B as a collection of components according to an embodiment of the present disclosure.

Shown in FIG. 3C is a network view of the connections of the ET200X_Conveyer 304, Plant Control 305, and Packaging components 306 in a plant design tool, in this example, SIMATIC iMap®. The logical view is substantially similar as in FIG. 3B. The OEM builds the components, generates the enriched PCD files and delivers them to the end user. From the enriched PCD files a network communication engineering tool, e.g., SIMATIC iMap®, has the information needed to generate the PROFINET communication code and download it to the components installed in the plant. The network communication engineering tool combines distributed applications from a complete plant and from different manufacturers and Configures of communication links between components. Since conveyor and the packaging machine can be implemented with any non-Siemens hardware, e.g., Allan-Bradley® CompactLogix as shown in FIG. 3A-C, they are connected to PROFINET using a Siemens proxy 307.

A preconfigured 'template' library is provided, e.g., a set of files that are needed by the network communication engineering tool for generating code involved in the inter component PROFINET communication. There is an entry in the template library for each well-known vendor of PLCs who register their PLCs with PROFIBUS international through PLC description files (GSD files), and those that can be connected to PROFINET through a proxy. An automatically check is performed to determine if the configuration can satisfy the user's design.

Figure 5:
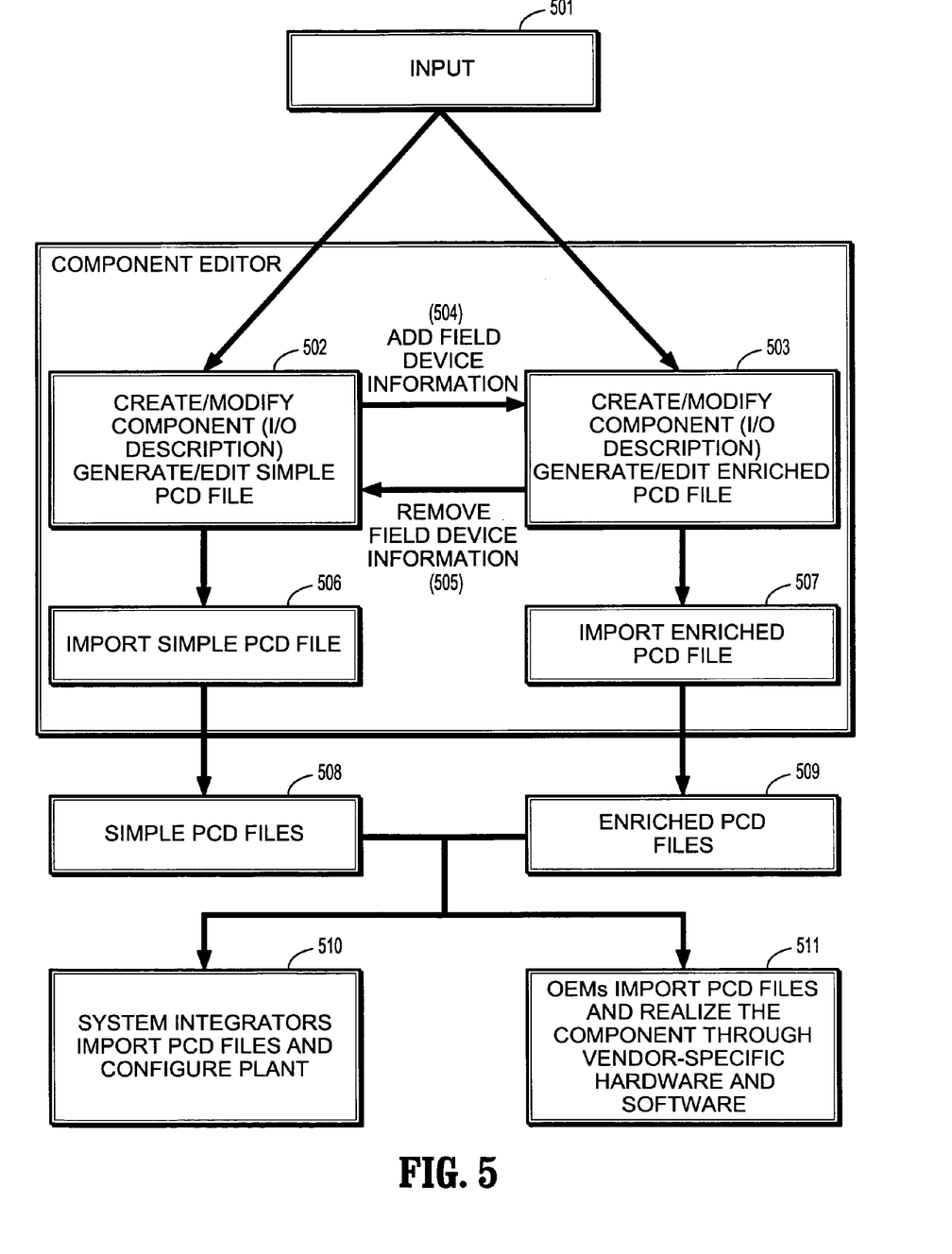
FIG. 5 is a flow chart of a method according to an embodiment of the present disclosure.

A method for generating component descriptions for component-based automation systems (as shown in FIG. 5) includes receiving an input of instructions 501, for example, as input by an end-user. The instructions direct the component editor to create or modify a simple component 502 or an enhanced component 503 of an automation system. A modification can include the addition 504 and/or removal 505 of device information. This addition 504 and/or removal 505 of device information may modify a simple component to form an enhanced component or vise versa. Further, created simple or enhanced components may be modified into like simple or enhanced components. The simple/enhanced components are imported as PCD files 508/509. The PCD files may be imported by system integrators and a plant may be configured 501. The PCD files may be imported by OEMs to realize a component in the system through vendor-specific hardware and software 511.

Figure 6:
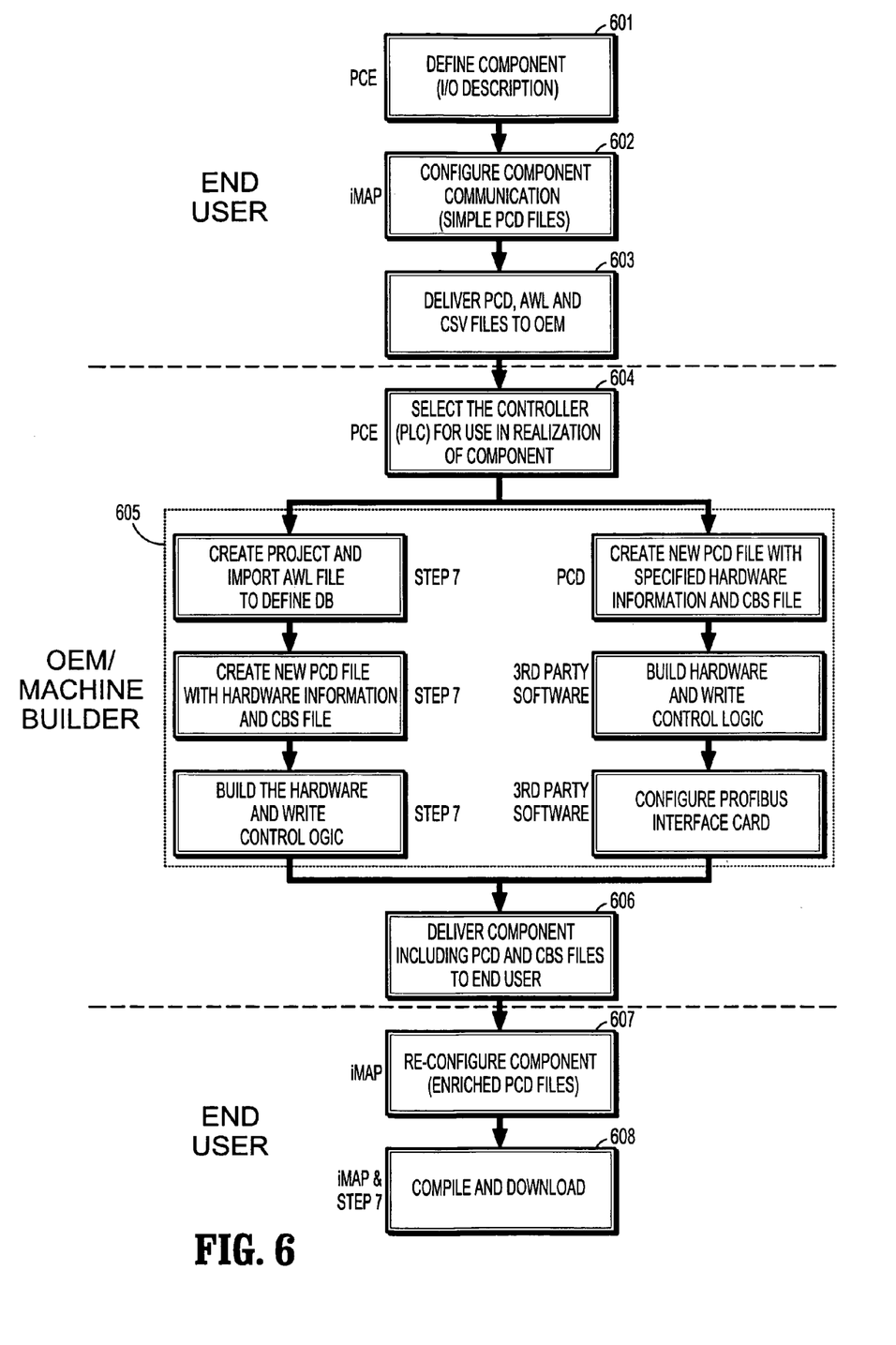
FIG. 6 is a flow chart of a method according to an embodiment of the present disclosure.

Referring to FIG. 6, a method for realizing a component for a component-based automation system includes defining a component based on I/Os 601, for example, as illustrated in FIG. 3A, 3B, 4 and 5. Communications parameters of the component are configured 602. Resulting files, e.g., PCD files, are received by a machine builder 603. The machine builder determines what hardware or software is needed 604 and configures the component 605. The realized component is delivered to the user 606. The component can be reconfigured by the user 607 (see for example, FIG. 5) and implemented in a component-based automation system 608. In FIG. 6, examples of software for performing actions described in the corresponding blocks are given, e.g., PCE (PROFINET component editor; such as shown in FIG. 3A), iMap and STEP 7.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 7:
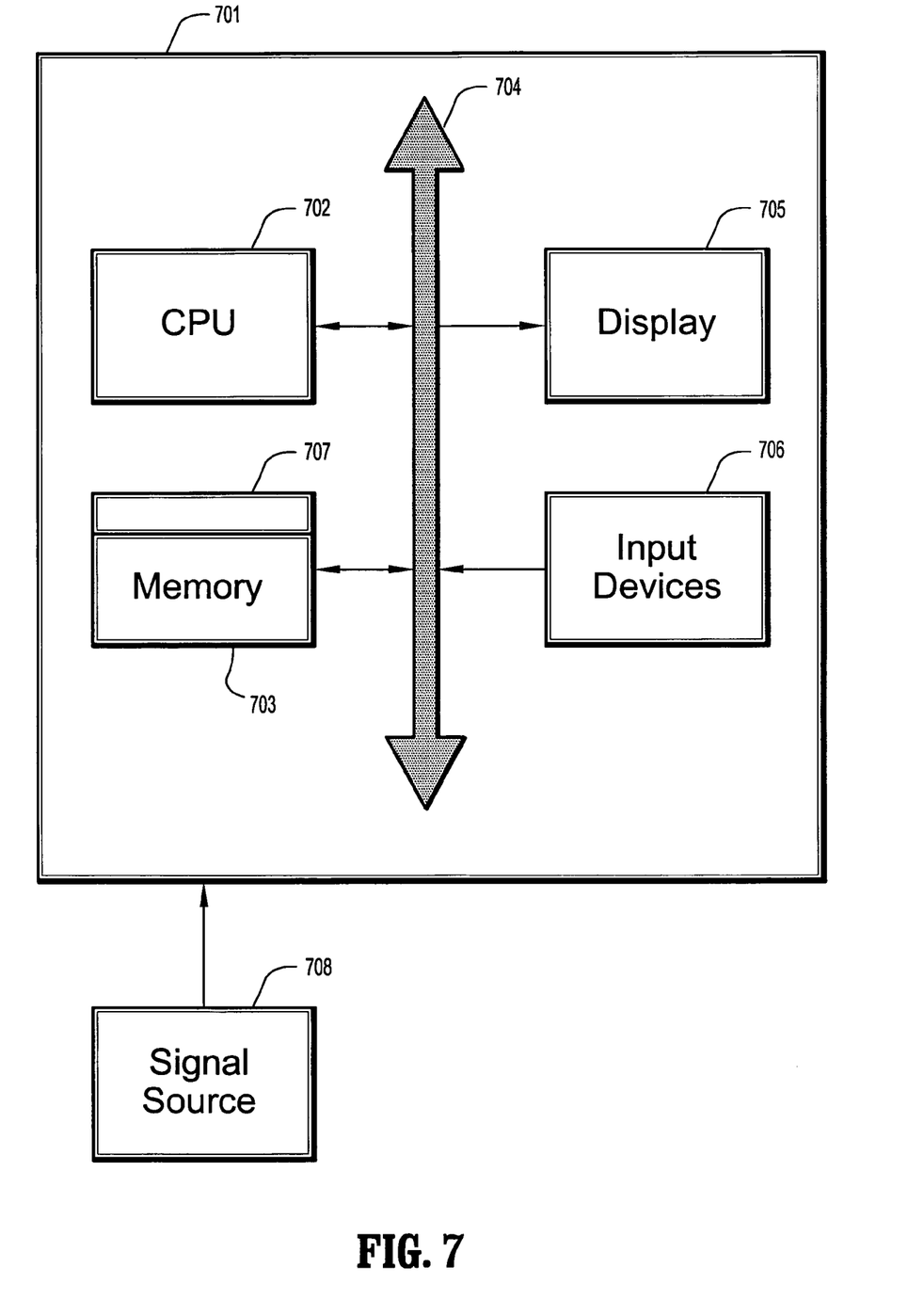
FIG. 7 is a diagram of a system according to an embodiment of the present disclosure.

Referring to FIG. 7, according to an embodiment of the present invention, a computer system 701 for implementing component-based automation, inter alia, a central processing unit (CPU) 702, a memory 703 and an input/output (I/O) interface 704. The computer system 701 is generally coupled through the I/O interface 504 to a display 705 and various input devices 706 such as a mouse and keyboard. The support circuits can include circuits such as cache, power supplies, clock circuits, and a communications bus. The memory 703 can include random access memory (RAM), read only memory (ROM), disk drive, tape drive, etc., or a combination thereof. The present invention can be implemented as a routine 707 that is stored in memory 703 and executed by the CPU 702 to process the signal from the signal source 708. As such, the computer system 701 is a general-purpose computer system that becomes a specific purpose computer system when executing the routine 607 of the present invention.

The computer platform 701 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for component-based automation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for generating a component of an automation system comprising:

describing the component as a plurality of inputs and outputs;

generating a vendor-independent component description file based on a description of the component as the plurality of inputs and outputs;

updating the vendor-independent component description file to include vendor-specific hardware information and hardware control logic; and loading an updated vendor-specific component description into the component, the updated vendor-specific component description enabling communications with an automated component of the automation system via the plurality of inputs and outputs and control of the component by the automation system via the hardware control logic.

2. The computer-implemented method of claim 1, wherein the automation system is a network of components.

3. The computer-implemented method of claim 2, further comprising providing a network proxy for the component wherein the component uses a communications standard different than the network of components.

4. The computer-implemented method of claim 1, wherein generating the vendor-independent component description file comprises generating a human-readable file corresponding the vendor-independent component description file.

5. The computer-implemented method of claim 1, wherein generating the vendor-independent component description file comprises generating a programmable logic control program for controlling the component via the inputs and outputs.

6. The computer-implemented method of claim 1, wherein updating the vendor-independent component description file comprises updating the programmable logic control program to include vendor-specific control logic for controlling the component via the inputs and outputs.

7. The computer-implemented method of claim 1, wherein the description of the component as the plurality of inputs and outputs consists of a header, a vendor-independent device specification, network-related information and an input and output interface description.

8. A program storage device readable by machine, tangibly embodying a program of instructions executable by the machine to perform method steps for controlling a component of an automation system, the method steps comprising:

receiving a component description (PCD) file into the program storage device of the component, the PCD comprising component-independent instructions for accessing a plurality of inputs and outputs of the automation system and component-specific instructions for controlling the component, the component-specific instructions comprising hardware control logic;

receiving network communication code into the program storage device for connecting the component to the automation system via the plurality of inputs and outputs; and performing an automated function of the component according to communications understood by the network communication code for communicating with the hardware control logic in response to an input of a connected component of the automation system.

9. The method of claim 8, further comprising communicating with a network proxy for the component wherein the component uses a communications standard different than the connected component of the automation system.

10. The method of claim 8, wherein the PCD comprises generating a human-readable file corresponding the vendor-independent component description file.

11. The method of claim 8, wherein the component-independent instructions for accessing the plurality of inputs and outputs consists of a header, a vendor-independent device specification, network-related information and an input and output interface description.

12. A method for generating a component of an automation system comprising:

describing the component as a plurality of inputs and outputs to the automation system;

generating a vendor-independent component description file based on a description of the component as the plurality of inputs and outputs;

creating hardware for the component according to the description of the component as the plurality of inputs and outputs;

updating the vendor-independent component description file to include vendor-specific hardware information and hardware control logic corresponding to the hardware for creating the component; and loading an updated vendor-specific component description into the component, the updated vendor-specific component description enabling communications with an automated component of the automation system via the plurality of inputs and outputs and control of the component by the automation system via the hardware control logic.

13. The method of claim 12, further comprising coupling the component directly to the automation system wherein the component supports a communication standard of a network of the automation system.

14. The method of claim 12, further comprising coupling the component to the automation system via a proxy, wherein the component does not support a communication standard of a network of the automation system.

\* \* \* \* \*